United States Patent
Yi et al.

(10) Patent No.: US 8,219,710 B2
(45) Date of Patent: Jul. 10, 2012

(54) METHOD OF ESTABLISHING A DATA CONNECTION WITH A TELEMATICS-EQUIPPED VEHICLE

(75) Inventors: Ki Hak Yi, Windsor (CA); Sethu K. Madhavan, Canton, MI (US); Hamadi Jamali, Oakland Charter Township, MI (US)

(73) Assignee: General Motors LLC, Detroit, MI (US)

( * ) Notice: Subject to any disclaimer, the term of this patent is extended or adjusted under 35 U.S.C. 154(b) by 1126 days.

(21) Appl. No.: 11/554,000

(22) Filed: Oct. 28, 2006

(65) Prior Publication Data

US 2008/0102854 A1 May 1, 2008

(51) Int. Cl.
*G06F 15/16* (2006.01)
*H04H 20/74* (2008.01)
*H04M 1/663* (2006.01)
*G08G 1/123* (2006.01)
*G01C 21/10* (2006.01)

(52) U.S. Cl. ............... 709/245; 455/3.02; 455/414.2; 340/988; 701/210

(58) Field of Classification Search .......... 709/220, 709/245; 705/4; 455/411–412
See application file for complete search history.

(56) References Cited

U.S. PATENT DOCUMENTS

| 2003/0103482 A1* | 6/2003 | Van Bosch | 370/338 |
| 2004/0152446 A1* | 8/2004 | Saunders et al. | 455/411 |
| 2005/0273505 A1* | 12/2005 | Kim | 709/220 |
| 2005/0283388 A1* | 12/2005 | Eberwine et al. | 705/4 |

FOREIGN PATENT DOCUMENTS

| CN | 1524372 A | 8/2004 |
| DE | 19728033 A1 | 1/1999 |

OTHER PUBLICATIONS

Office Action for Chinese Patent Application No. 200710167941.4, 7 pages.

* cited by examiner

*Primary Examiner* — Haresh N Patel
*Assistant Examiner* — Evans Desrosiers
(74) *Attorney, Agent, or Firm* — Anthony L. Simon; Reising Ethington P.C.

(57) ABSTRACT

A method for establishing a wireless, mobile-terminated data connection with a telematics-equipped vehicle so that data can be sent to and received from the vehicle. Generally, the method involves receiving network address update information from a wireless carrier system, using the network address update information to determine if a network address currently exists for a particular telematics-equipped vehicle, and using the current network address (if one exists) to establish a wireless, mobile-terminated data connection with the telematics-equipped vehicle. This method addresses some of the challenges involved in creating a mobile-terminated data connection with a device that has a temporary or dynamic network address.

20 Claims, 2 Drawing Sheets

METHOD OF ESTABLISHING A DATA CONNECTION WITH A TELEMATICS-EQUIPPED VEHICLE

TECHNICAL FIELD

The present invention generally relates to a method for communicating data and, more particularly, to a communications method that establishes a wireless, mobile-terminated data connection with a telematics-equipped vehicle having a dynamic network address.

BACKGROUND

Numerous types of wireless communication devices are used throughout the world each day, including devices such as cellular phones, pagers, personal digital assistants (PDAs), and vehicle communication devices. Many of these devices use one or more types of communication channels, including voice and data channels, to provide a variety of services over wireless networks. Some devices utilize data encoding techniques to communicate both voice and data information over a voice channel, while other devices must use a data channel to send data information. In certain instances, the use of a dedicated data channel to send and receive data information can result in enhanced data services such as additional bandwidth, error detection, and inter-operability with other devices.

Wireless communication devices that engage in data transmission over a data channel generally use a multi-layered addressing system. Furthermore, it is not uncommon for a multi-layered addressing system to utilize temporary or dynamic network addresses for data communication; that is, network addresses that are only associated with a device on a temporary basis. It can therefore be challenging to establish a mobile-terminated data connection with a wireless device, when that device is assigned a network address that changes over time.

SUMMARY OF THE INVENTION

According to an aspect of the invention, there is provided a method of obtaining a network address for a telematics-equipped vehicle. The method generally comprises the steps of: (a) receiving a network address update message from a wireless carrier system that includes at least one network address and associated vehicle identifier; (b) saving the at least one network address and associated vehicle identifier; (c) receiving a network address request message that includes at least one provided vehicle identifier; (d) searching the network address server for an associated vehicle identifier that matches the provided vehicle identifier, and if such an associated vehicle identifier is found, then obtaining the corresponding network address; and (e) sending a network address response message that is at least partially based on the results of the search in step (d).

According to another aspect, there is provided a method of establishing a mobile-terminated data connection with a telematics-equipped vehicle in a dormant mode.

According to yet another aspect, there is provided a method of establishing a mobile-terminated data connection with a telematics-equipped vehicle in an idle mode.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The communications method described below attempts to establish a wireless, mobile-terminated data connection with a telematics-equipped vehicle so that data can be sent to and received from the vehicle. Generally, this method involves periodically receiving network address update information from a wireless carrier system, using the update information to determine whether a network address currently exists for a particular telematics-equipped vehicle, and using the current network address (if one exists) to establish a wireless, mobile-terminated data connection with the telematics-equipped vehicle. This communications method addresses some of the challenges involved in creating a mobile-terminated data connection with a device that has a temporary or dynamic network address.

Communications System—

Figure 1:
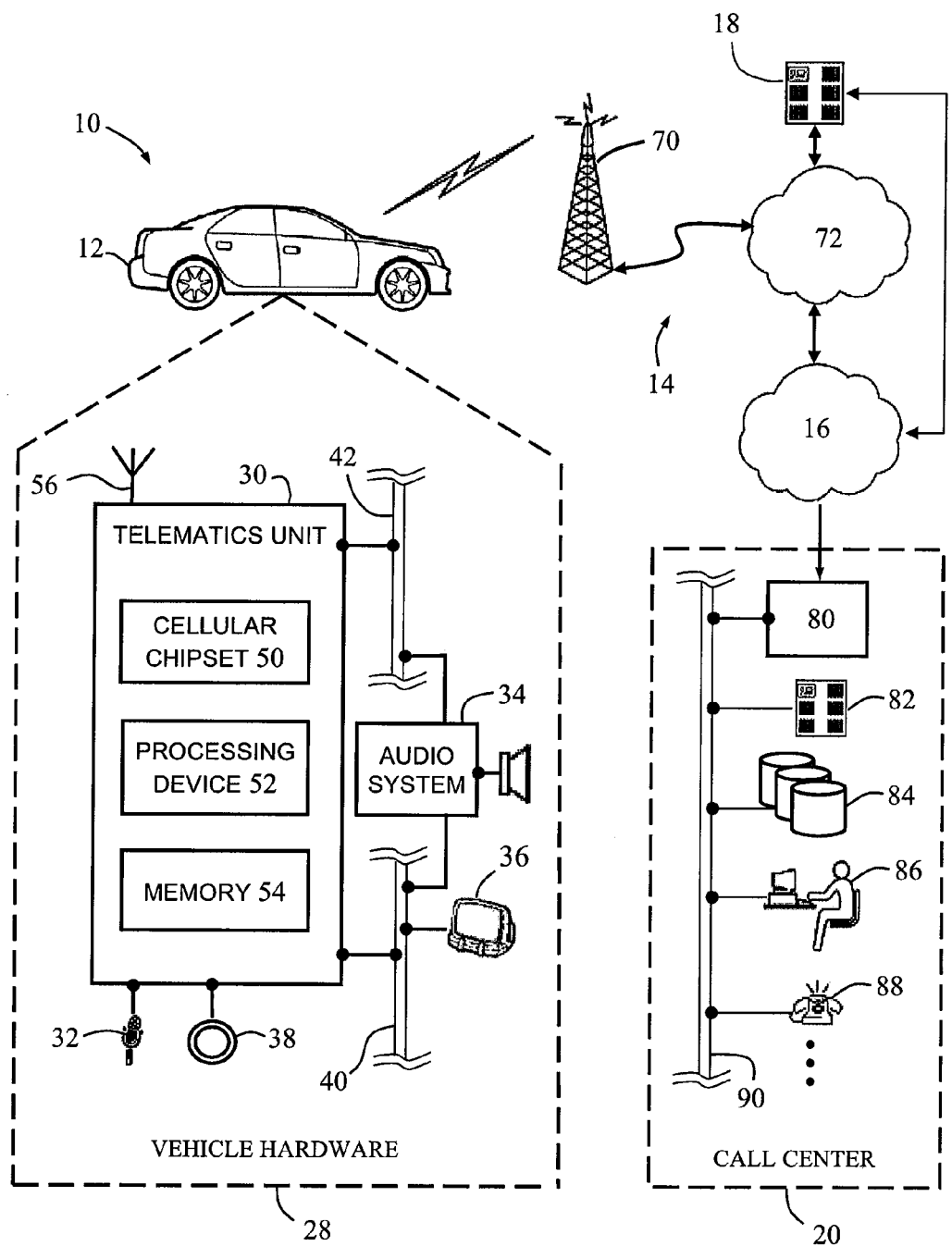
FIG. 1 is a block diagram depicting an exemplary embodiment of a communications system that is capable of utilizing the communications method disclosed herein.

Beginning with FIG. 1, there is shown an exemplary operating environment that can be used to implement the communications method disclosed herein. Communications system 10 generally includes a vehicle 12, a wireless carrier system 14, a communications network 16, a network address server 18, and a call center 20. It should be understood that the communications method can be used with any number of different systems and is not specifically limited to the examples shown here. Also, the overall architecture, setup, and operation, as well as the individual components, of a system such as that shown here are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle hardware 28 is shown generally in FIG. 1 and includes a telematics unit 30, a microphone 32, an audio system 34, a visual display 36, and an electronic button or control 38 that are interconnected using one or more network connections, such as a communications bus 40 or an entertainment bus 42. Examples of suitable network connections include a controller area network (CAN), a media oriented system transfer (MOST), a local interconnection network (LIN), an ethernet, a local area network (LAN), and other appropriate connections such as those that conform with known ISO, SAE and IEEE standards and specifications, to name but a few.

Telematics unit 30 preferably enables wireless voice and/or data communication over wireless carrier system 14 so that the vehicle can communicate with call center 20, other telematics-enabled vehicles, or some other entity. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc.

According to one embodiment, telematics unit 30 includes a standard cellular chipset 50 for voice communications like hands-free calling, a modem (not shown) for data transmission, an electronic processing device 52, one or more electronic memory devices 54, and a dual antenna 56. It should be appreciated that the modem can either be implemented through software that is stored in the telematics unit and is processed by electronic processing device 52, or it can be a separate hardware component located internal or external to telematics unit 30. The modem can operate using any number of different standards or protocols such as EVDO, CDMA 1XRTT, GPRS, EDGE, WiMAX and HSDPA, to name but a few.

Electronic processing device 52 can be any type of suitable processing device capable of processing electronic instructions including, but certainly not limited to, microprocessors, microcontrollers, host processors, controllers, vehicle communication processors, and application specific integrated circuits (ASICs). Alternatively, the electronic processing device can work in conjunction with some type of central processing unit (CPU) or other component performing the function of a general purpose processor. Electronic processing device 52 executes various types of electronic instructions, such as software or firmware programs stored in electronic memory 54, which enable the telematics unit to provide a wide variety of services. For instance, electronic processing device 52 can execute programs or process data that enables the communications method discussed herein.

Telematics unit 30 provides too many services to list them all, but several examples include: turn-by-turn directions and other navigation-related services that are provided in conjunction with a GPS-based vehicle navigation module (not shown); airbag deployment notification and other emergency or roadside assistance-related services that are provided in connection with one or more collision sensor interface modules such as a body control module (not shown); and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an illustration of some of the services that the telematics unit is capable of offering. Furthermore, it should be understood that the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are located external to telematics unit 30, they could utilize vehicle bus 40 and/or entertainment bus 42 for communication therebetween. It is anticipated that one or more of the modules that interact with telematics unit 30 will utilize sensors, like gyroscopes, accelerometers, magnetometers, and emission detection sensors, for reporting different operational, environmental, or other conditions surrounding the vehicle.

Vehicle hardware 28 also includes a number of vehicle user interfaces that provide vehicle occupants with a means of providing and/or receiving information, including microphone 32, audio system 34, visual display 36, and button 38. These devices allow a vehicle user to input commands, receive audio/visual feedback, and provide voice communications, to name but some of the possibilities. Microphone 32 provides an occupant with a means for inputting verbal or other auditory information, and can be connected to an automated voice processing unit utilizing human-machine interface (HMI) technology known in the art. Conversely, audio system 34 provides verbal output to a vehicle occupant and can be a dedicated, stand-alone system or part of the primary vehicle audio system. According to the particular embodiment shown here, audio system 34 is operatively coupled to both vehicle bus 40 and entertainment bus 42 and can provide AM, FM and satellite radio, CD, DVD and other multimedia functionality. This functionality can be provided in conjunction with or independent of the infotainment module described above. Visual display 36 is preferably a graphics display, such as a touch screen on the instrument panel or a heads-up display reflected off of the windshield, and can be used to provide a multitude of input and output functions. Button 38 is an electronic pushbutton or other control that is typically used to initiate communication with call center 20 or some other service. Of course, numerous other vehicle user interfaces can also be utilized, as the aforementioned interfaces are only examples of some of the possibilities.

Wireless carrier system 14 is preferably a cellular telephone system, but could be any other suitable wireless system, such as a satellite-based system capable of transmitting signals between vehicle hardware 28 and call center 20. According to an exemplary embodiment, wireless carrier system 14 includes one or more cell towers 70, base stations and/or mobile switching centers (MSCs) 72, as well as any other networking components required to connect wireless carrier system 14 with land network 16. As is appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Wireless carrier system 14 may utilize various networking devices or components like routers, servers, switches, etc. to facilitate data channel communications and/or provide additional services and features. For example, wireless carrier system 14 may utilize any number of networking components to provide one or more of the following services: authentication, dynamic host configuration protocol (DHCP), network address assignment, domain name system (DNS), dynamic DNS (DDNS), mobile number to network address resolution, SO33 paging, and other network services. It will be appreciated by those skilled in the art that such services may be performed by any number of devices or components located within wireless carrier system 14, land network 16, call center 20, or simply in communication with wireless carrier system 14.

In one embodiment, wireless carrier system 14 may use authentication services to verify that each telematics-equipped vehicle that requests a data channel connection is authorized to do so. Authorization may be accomplished in a number of ways including, for example, using the mobile number of the telematics-equipped vehicle to verify that the vehicle is authorized to use a data channel. Wireless carrier system 14 may then provide the telematics-equipped vehicle 12 with a dynamic network address using dynamic host configuration protocol (DHCP), or any other suitable method of allocating dynamic network addresses to telematics-equipped vehicles.

Land network 16 may be a conventional land-based telecommunications network that is connected to one or more landline telephones and connects wireless carrier system 14 to call center 20. For example, land network 16 may include a public switched telephone network (PSTN) and/or a TCP/IP network, as is appreciated by those skilled in the art. Of course, one or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Network address server 18 preferably receives, stores, manages, searches and/or provides information that correlates network addresses with specific vehicle identifiers. Network address server 18 can be implemented according to one of a number of different software and/or hardware arrangements known in the art. For instance, network address server 18 can include a dedicated computer or a shared component of a separate computing system, to name but a few possibilities. Furthermore, it is possible for network address server 18 to be housed at wireless carrier network 14, land network 16, call center 20, a dedicated location (as shown), or any other appropriate computing facility. Generally, network address server 18 is in communication with wireless carrier system 14 and land network 16, although such communication may be indirect and facilitated by intermediary devices like a firewall and/or a proxy server. In one embodiment, network address server 18 is a standalone networked server computer, such as a DNS server, that manages a database populated with information received from wireless carrier system 14. The DNS server can store information like vehicle identifier/network address pairings in a database; manage the stored data by adding, deleting, or updating records; search the stored data upon request; and provide search result information, for example.

Call center 20 is designed to provide the vehicle hardware 28 with a number of different system back-end functions and, according to the exemplary embodiment shown here, generally includes one or more switches 80, servers 82, databases 84, live advisors 86, as well as a variety of other telecommunication and computer equipment 88 that is known in the art. These various call center components are preferably coupled to one another via a wired or wireless local area network 90. Switch 80, which can be a private branch exchange (PBX) switch, routes incoming signals so that voice transmissions are usually sent to either the live adviser 86 or an automated response system, and data transmissions are passed on to a modem or other piece of equipment 88 for demodulation and further signal processing. The modem preferably includes an encoder, as previously explained, and can be connected to various devices such as a server 82 and database 84. Database 84 could be designed to store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20, it will be appreciated that the call center can utilize an unmanned automated call response system and, in general, can be any central or remote facility, manned or unmanned, mobile or fixed, to or from which it is desirable to exchange voice and data transmissions.

Communications Method—

The present communications method can be used to establish a wireless, mobile-terminated data connection with a telematics-equipped vehicle, such as vehicle 12. Many telematics-equipped vehicles can simultaneously engage in data communication over a wireless network, such as wireless carrier system 14. Generally, such vehicles use a multi-layered addressing system when communicating over a data channel of a wireless carrier system. For example, a typical multi-layered addressing system utilizes at least two types of identifiers. The first identifier is a hardware identifier, which is generally an unchangeable, unique identification number and is often referred to as an electronic serial number (ESN) or a mobile equipment identifier (MEID) in the case of a cellular chipset, or a media access control address (MAC address) in the case of a modem. Within vehicle 12, one or more hardware identifiers may be electronically or otherwise embedded in telematics unit 30, cellular chipset 50, the modem, or another suitable component or device within vehicle hardware 28. The hardware identifier is oftentimes hard-coded by the manufacturer, who not only ensures that no two devices have the same identifier, but also inserts them in a manner so that they cannot be modified.

The second identifier is a software identifier and is generally an assignable and changeable identification number that uniquely identifies a particular hardware device. Examples of software identifiers include a mobile identification number (MIN) or mobile directory number (MDN) in the case of a cellular device like cellular chipset 50, and a network address or internet protocol address (IP address) in the case of the modem. In communications system 10, the network or IP address is oftentimes assigned by wireless carrier system 14 and can be on a static or dynamic basis. A static network address is usually assigned on a semi-permanent basis and will remain constant until it is manually changed or reassigned. A dynamic network address, on the other hand, can be assigned by the wireless network each time a data connection is established. A wireless device, such as telematics unit 30, may receive a different network address each time a data channel connection is made. Because the network address changes frequently, contacting a wireless device over a data channel using its dynamic network address can be challenging.

The data connections established over wireless carrier system 14 are preferably packet data connections that are compliant for use with a TCP/IP protocol suite, however, they could use other protocol arrangements known to those skilled in the art. Outbound communications originating from vehicle 12 are generally called mobile-originated connections, while inbound communications attempting to connect with vehicle 12 are usually called mobile-terminated connections. For example, when an occupant in vehicle 12 requests a webpage or internet service, a mobile-originated data connection over wireless carrier system 14 is initiated by telematics unit 30. In response to this outbound connection initialization, wireless carrier system 14 assigns a dynamic network address to the telematics-equipped vehicle 12 so that other devices, such as internet connected websites and servers, can send inbound communications back to the vehicle. In the example of a mobile-terminated connection, in order for an outside device to establish a data connection with vehicle 12, they may need the vehicle's network address. As previously explained, obtaining a dynamic network address for a telematics-equipped vehicle where the network address frequently changes can be difficult. The communications method described below facilitates mobile-terminated data connections by generally obtaining, managing, and providing dynamic network addresses to devices that are attempting to make inbound data connections with telematics-equipped vehicle 12.

Figure 2:
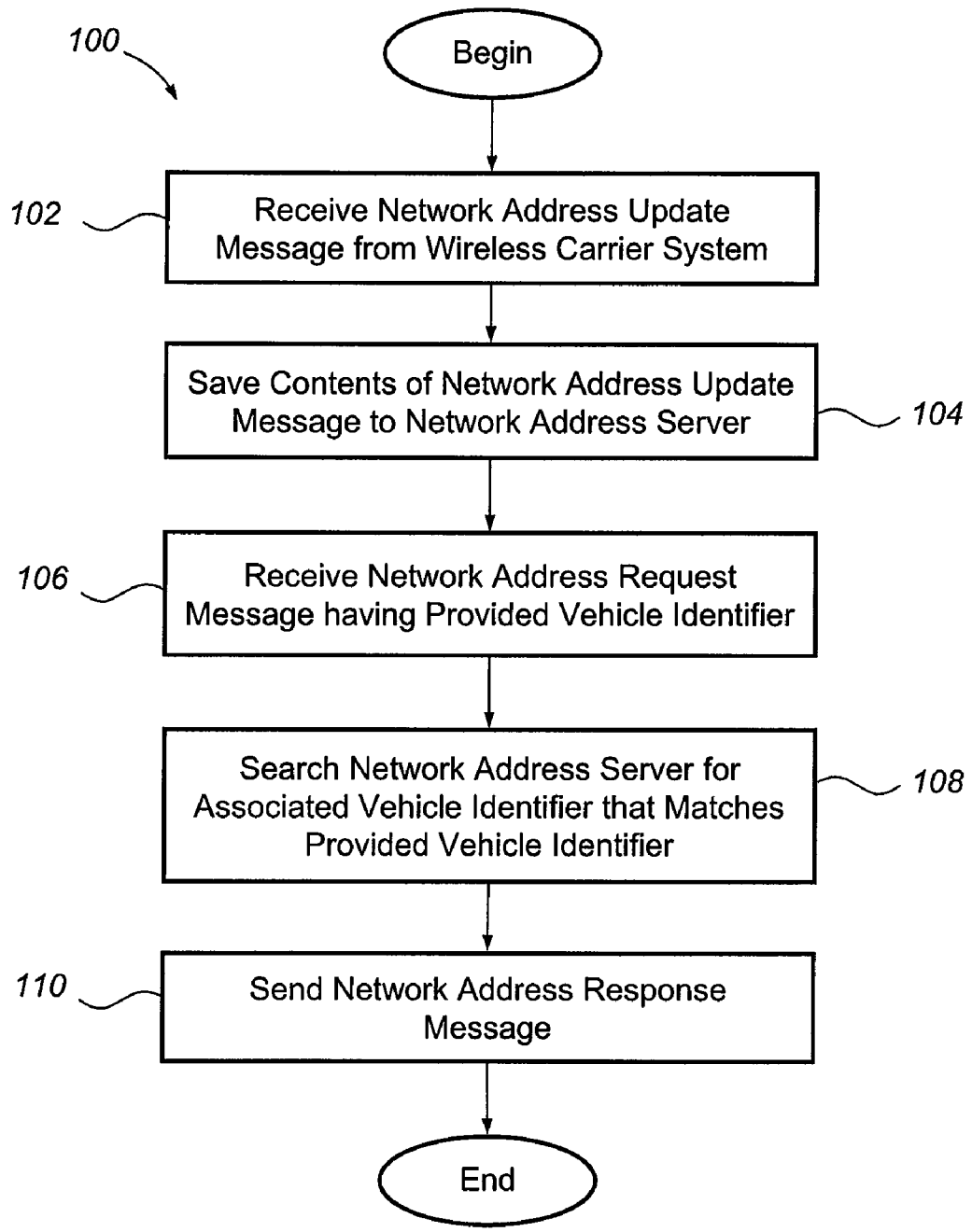
FIG. 2 is a flow chart depicting some of the steps of an embodiment of the communications method.

Turning now to FIG. 2, communications method 100 begins by receiving a network address update message from wireless carrier system 14, step 102. The network address update is preferably sent by wireless carrier system 14 and includes at least one vehicle identifier/network address pairing made up of a vehicle identifier and an associated network address. As its name suggests, a vehicle identifier/network address pairing generally relates a specific vehicle identifier to a specific network address. This way if one knows a vehicle identifier, they can use a vehicle identifier/network address pairing to determine a corresponding network address. The term 'vehicle identifier' broadly includes any type of information that uniquely identifies a particular telematics-equipped vehicle including, but not limited to, hardware and software identifiers such as MINs, MDNs, ESNs, MEIDs, MAC addresses, VINs, and subscriber account numbers and/or names.

It should be appreciated that the network address update message could be sent by one of any number of different devices, components, sub-systems, etc. of wireless carrier system 14, depending on how the system is designed. According to one embodiment, wireless carrier system 14 uses an authentication server to update and store the vehicle identifier/network address pairing information each time an outbound or mobile-originated data connection is made. That is, each time telematics-equipped vehicle 12 requests a mobile-originated data connection, an authentication server or other system component first determines if the vehicle is authorized to make data connections, and if so, assigns the vehicle a dynamic network address. The vehicle identifier that is used to distinguish the vehicle, as well as the newly assigned dynamic network address, are then saved as a vehicle identifier/network address pairing that is capable of being sent to network address server 18. It should be recognized that it is possible for the vehicle identifier/network address pairing information to be gathered, stored and/or provided by a device other than an authentication server, as described above. For example, wireless carrier system 14 could use a domain name system (DNS) server, a dynamic host configuration protocol (DHCP) server, or some other server or device to perform the actions of step 102. The network address update of step 102 could be sent in response to a request from network address server 18, or it could be sent by wireless carrier system 14 on its own initiative without any request.

It is also possible for the network address update message to include information in addition to the vehicle identifier/network address pairing described above. For instance, the network address update could also include: the date and time of the last update by wireless carrier system 14, the time to live (TTL) of the dynamic network address, the expiration date of the dynamic network address, a cell tower identifier, a geographic location, or other information relating to vehicle 12. The network address update may also include instructions to add, delete, or modify certain information. For example, a network address update may contain instructions to delete all information related to a particular network address or a particular vehicle identifier.

Next, the various vehicle identifier/network address pairings, and/or any other contents of the network address update, are saved by network address server 18, step 104. The information taken from the network address update message can be stored in a variety of different formats, including a text file, a look-up table, a database, or other computer-readable file, to name but a few. Network address server 18 may also update, delete, or create new record entries each time a new network address update is received. For example, wireless carrier system 14 preferably sends a network address update to server 18 each time a data channel connection is established with a telematics-equipped vehicle, whether mobile-originated or mobile-terminated. In response to receiving each message, network address server 18 may update a database entry so that only up-to-date pairing information is maintained. In one embodiment, the network address server 18 that receives and saves the contents of the network address update is a dynamic domain name system (DDNS) device.

In step 106, network address server 18 receives a network address request message having a vehicle identifier. Generally, the network address request message is sent because some entity wishes to establish a mobile-terminated data connection with vehicle 12 and desires a valid network or IP address for the vehicle. For example, call center 20 may seek to establish a mobile-terminated data connection with vehicle 12, and thus sends a network address request message including a provided vehicle identifier to network address server 18. As previously explained, the vehicle identifier can be any type of information that uniquely identifies a particular telematics-equipped vehicle. In the event that call center 20 wishes to establish mobile-terminated data connections with multiple vehicles, it is possible for the network address request message to include information that identifies an entire group of vehicles. Exemplary types of such information include a simple list of multiple vehicle identifiers, a geographic location covering all of the vehicles within a certain proximity of that location, and one or more pieces of subscriber information covering all of the subscriber accounts that satisfy such information. It should be appreciated that the network address request message may come from a different system component other than call center 20. For instance, the network address request message could be sent by a telematics unit, an engineering or other facility, a cellular phone, a PDA, a personal or laptop computer, an IP push server, a router, a messaging device, or any internet connected device.

After receiving the network address request message, a search of the stored data within network address server 18 is conducted for a network address that matches the provided vehicle identifier, step 108. The searching can be performed in databases that are internal and/or external to network address server 18, as well as other data structures known to those skilled in the art. As an example, if the network address request message includes a provided vehicle identifier in the form of a mobile identification number (MIN), then step 108 searches the contents of network address server 18 to try and locate a data entry that matches the provided MIN so that a valid, corresponding network address (preferably in the form of an IP address) can be obtained. Of course, the search could be based on any other vehicle identifier, as a MIN is simply one example. This step may also employ additional steps to ensure the validity of a corresponding network address located in the search, such as performing a time comparison once a corresponding network address is located to determine the age of the dynamic network address. If the age is above a threshold value, then the corresponding network address may be considered to be expired or out-of-date.

After the search is performed, network address server 18 sends a network address response message that is at least partially based on the results of the search, step 110. For example, if the telematics-equipped vehicle currently has a valid corresponding network address (a situation sometimes referred to as 'dormant mode') and the search in step 108 is able to find it, then the network address response message sent to call center 20 will include the corresponding network address. In that case, call center 20 will be able to use the corresponding network address to initiate a mobile-terminated data connection with vehicle 12. The mobile-terminated connection can use standard protocols like TCP/IP for communication, but may also use proprietary or non-standard protocols as well. Again, the network address response message may include information in addition to a network address such as the time of the last data channel connection, the date and/or time of the expiration of the dynamic network address, an error message, etc.

If, on the other hand, the telematics-equipped vehicle does not have a valid corresponding network address (a situation sometimes referred to as 'idle mode'), then the network address response message can be sent to one or more system components. For example, a network address response message could be sent back to the entity that requested the network address in the first place (the call center in several of the examples above) so that the requesting entity is informed that no valid, corresponding network address currently exists. Separately, a network address response message including the vehicle identifier provided in step 106 could be sent to wireless carrier system 14, where the message requests the establishment of a data channel connection with telematics-equipped vehicle 12. Stated differently, if network address server 18 is unable to locate a valid network address, instead of simply ending the process there, it could provide wireless carrier system 14 with the provided vehicle identifier and request that the wireless carrier system establish a mobile-terminated data connection. It should be recognized, however, that not all wireless networks have the ability to perform such a step. Examples of some of the mobile-terminated connection techniques available to wireless carrier system 14 include using a voice channel to first contact the telematics-equipped vehicle, SO33 paging, etc. Furthermore, wireless carrier system 14 could actually establish the data connection, or it could simply acquire a network address and pass it along to call center 20 or some other entity so they may establish the data connection.

It should be appreciated that the network address response message can be sent directly to the entity or device trying to establish the mobile-terminated data connection, or it can be sent to an intermediary device such as a router, a DNS or DDNS device, a different call center 20, an IP Push server, a messaging system, a cellular phone, a PDA, another telematics-equipped vehicle 12, or any other networking device or component.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of obtaining a network address for a telematics-equipped vehicle, the method comprising the steps of:
    (a) receiving a network address update message from a wireless carrier system at a network address server, the network address update message includes at least one network address and associated vehicle identifier and the network address update message is sent by the wireless carrier system;
    (b) saving the at least one network address and associated vehicle identifier from the network address update message sent by the wireless carrier system to the network address server;
    (c) receiving a network address request message for a mobile-terminated call at the network address server, the network address request message includes at least one provided vehicle identifier and is sent by a remote entity attempting to make a mobile-terminated call to the telematics-equipped vehicle;
    (d) searching the network address server for an associated vehicle identifier that matches the provided vehicle identifier, and when such an associated vehicle identifier is found then obtaining the corresponding network address from the network address server; and
    (e) sending a network address response message for a mobile-terminated call that is at least partially based on the results of the search in step (d), the network address response message includes the corresponding network address and is sent by the network address server back to the remote entity so that the remote entity can utilize the corresponding network address to establish a mobile-terminated data connection with the telematics-equipped vehicle.

2. The method of claim 1, wherein the network address is a dynamically assigned internet protocol (IP) address.

3. The method of claim 1, wherein the associated vehicle identifier is selected from the group consisting of: a mobile identification number (MIN), a mobile directory number (MDN), an electronic serial number (ESN), a mobile equipment identifier (MEID), a media access control address (MAC address), a vehicle identification number (VIN), a subscriber account number, and a subscriber name.

4. The method of claim 1, wherein the network address update message of step (a) further includes at least one item selected from the group consisting of: a date, a time, a time to live (TTL), an expiration date, a cell tower identifier, and a geographic location.

5. The method of claim 1, wherein the network address update message of step (a) is received from a wireless carrier system component selected from the group consisting of: an authentication server, a domain name system (DNS) server, a dynamic domain name server (DDNS), and a dynamic host configuration protocol (DHCP) server.

6. The method of claim 1, wherein the network address server of step (b) is a dynamic domain name system (DDNS) server.

7. The method of claim 1, wherein the network address request message of step (c) is received from at least one member of a group consisting of: a call center, an IP push server, a router, and a messaging device.

8. The method of claim 1, wherein the network address request message of step (c) further includes a plurality of provided vehicle identifiers corresponding to a plurality of telematics-equipped vehicles for which network addresses are desired.

9. The method of claim 1, wherein the network address response message of step (e) includes the corresponding network address and is sent to a call center so that the call center can utilize the corresponding network address to establish a mobile-terminated data connection with the telematics-equipped vehicle.

10. The method of claim 1, wherein the network address response message of step (e) includes information that a corresponding network address cannot be located, is unavailable, has expired, or does not exist.

11. The method of claim 1, wherein the network address response message of step (e) includes the provided vehicle identifier and is sent to the wireless carrier system so that the wireless carrier system can utilize the provided vehicle identifier to establish a mobile-terminated data connection with the telematics-equipped vehicle.

12. A method of establishing a mobile-terminated data connection with a telematics-equipped vehicle in a dormant mode, the method comprising the steps of:
 (a) providing a vehicle identifier that identifies the telematics-equipped vehicle in a dormant mode with which the mobile-terminated data connection is desired;
 (b) sending a network address request message from a first system component that is attempting to establish a mobile-terminated data connection with the telematics-equipped vehicle to a second system component, wherein the network address request message includes the provided vehicle identifier;
 (c) searching the second system component for a data entry that matches the provided vehicle identifier, and obtaining a corresponding network address when such a match is found;
 (d) sending a network address response message from the second system component back to the first system component, the network address response message includes the corresponding network address and is sent to the first system component so that the first system component can utilize the corresponding network address to establish a mobile-terminated data connection with the telematics-equipped vehicle; and
 (e) using the corresponding network address to initiate a mobile-terminated data connection with the telematics-equipped vehicle in a dormant mode over a wireless network.

13. The method of claim 12, wherein the method further includes the step of: receiving a network address update message from a wireless carrier system that includes at least one network address/associated vehicle identifier pairing.

14. The method of claim 12, wherein the first system component is a call center and the second system component is a network address server.

15. The method of claim 12, wherein the network address request message of step (b) further includes a plurality of provided vehicle identifiers corresponding to a plurality of telematics-equipped vehicles for which network addresses are desired.

16. The method of claim 12, wherein the network address response message of step (d) is sent to a call center so that the call center can utilize the corresponding network address to initiate a mobile-terminated data connection with the telematics-equipped vehicle in step (e).

17. A method of establishing a mobile-terminated data connection with a telematics-equipped vehicle in an idle mode, the method comprising the steps of:
 (a) providing a vehicle identifier that identifies the telematics-equipped vehicle in an idle mode with which the mobile-terminated data connection is desired;
 (b) sending a network address request message from a first system component that is attempting to establish a mobile-terminated data connection with the telematics-equipped vehicle to a second system component, wherein the network address request message includes the provided vehicle identifier;
 (c) searching the second system component for a data entry that matches the provided vehicle identifier, and determining whether such a match currently exists;
 (d) when such a match does not currently exist, then sending a network address response message from the second system component to a wireless network that includes the provided vehicle identifier; and
 (e) causing the wireless network to use the provided vehicle identifier to establish a corresponding network address for the telematics-equipped vehicle so that the first system component can utilize the corresponding network address to initiate the mobile-terminated data connection with the telematics-equipped vehicle in the idle mode over the wireless network.

18. The method of claim 17, wherein the method further includes the step of: receiving a network address update message from a wireless carrier system that includes at least one network address/associated vehicle identifier pairing.

19. The method of claim 17, wherein the first system component is a call center and the second system component is a network address server.

20. The method of claim 17, wherein the network address request message of step (b) further includes a plurality of provided vehicle identifiers corresponding to a plurality of telematics-equipped vehicles for which network addresses are desired.

* * * * *